(12) United States Patent
Akka et al.

(10) Patent No.: US 7,570,260 B2
(45) Date of Patent: Aug. 4, 2009

(54) TILED VIEW-MAPS FOR AUTOSTEREOSCOPIC INTERDIGITATION

(75) Inventors: Robert Akka, Sausalito, CA (US); Mark H. Feldman, Walnut Creek, CA (US)

(73) Assignee: Real D, Beverly Hills, CA (US)

( * ) Notice: Subject to any disclaimer, the term of this patent is extended or adjusted under 35 U.S.C. 154(b) by 258 days.

(21) Appl. No.: 11/388,352

(22) Filed: Mar. 24, 2006

(65) Prior Publication Data

US 2006/0279580 A1 Dec. 14, 2006

Related U.S. Application Data

(60) Provisional application No. 60/665,597, filed on Mar. 26, 2005.

(51) Int. Cl.
*G06T 15/00* (2006.01)

(52) U.S. Cl. .................... 345/419; 382/194; 382/195; 382/165

(58) Field of Classification Search ............... 382/165, 382/194, 195
See application file for complete search history.

(56) References Cited

U.S. PATENT DOCUMENTS

| | | | | |
|---|---|---|---|---|
| 5,808,792 A * | 9/1998 | Woodgate et al. ........... 359/463 |
| 6,023,263 A * | 2/2000 | Wood .......................... 345/581 |
| 6,091,482 A * | 7/2000 | Carter et al. ................... 355/79 |
| 6,118,584 A * | 9/2000 | Van Berkel et al. .......... 359/463 |
| 6,302,541 B1 * | 10/2001 | Grossmann ................... 351/240 |
| 6,791,570 B1 * | 9/2004 | Schwerdtner et al. ........ 345/613 |
| 6,801,243 B1 * | 10/2004 | Van Berkel ..................... 348/59 |
| 6,825,985 B2 * | 11/2004 | Brown et al. ................. 359/619 |
| 6,972,744 B1 * | 12/2005 | Allio ............................. 345/88 |
| 2001/0050686 A1* | 12/2001 | Allen ........................... 345/543 |
| 2002/0011969 A1* | 1/2002 | Lipton et al. .................... 345/8 |
| 2004/0100464 A1* | 5/2004 | Oh et al. ....................... 345/419 |
| 2004/0100471 A1* | 5/2004 | Leather et al. ............... 345/506 |
| 2005/0059487 A1* | 3/2005 | Wilder et al. ................. 463/32 |
| 2005/0225502 A1* | 10/2005 | Nam et al. ..................... 345/55 |
| 2006/0012675 A1* | 1/2006 | Alpaslan et al. ............... 348/51 |
| 2006/0279567 A1* | 12/2006 | Schwerdtner et al. ........ 345/419 |
| 2006/0279580 A1* | 12/2006 | Akka et al. ................... 345/582 |

* cited by examiner

*Primary Examiner*—Kee M Tung
*Assistant Examiner*—David H Chu
(74) *Attorney, Agent, or Firm*—Baker & McKenzie LLP (57) ABSTRACT

A method for creating a reduced sized view-map of an autostereoscopic source image is disclosed. The method comprises creating a mathematical model for mapping the autostereoscopic source image into a first view-map, mapping the autostereoscopic source image into the first view-map, wherein the first view-map comprises a source-view image value and a plurality of pixel locations comprising an origin pixel, scanning the first view-map for at least one pixel location whose source-view image value closely matches that of the origin pixel, and generating the reduced sized view-map by replicating matched pixel locations within the first view-map.

20 Claims, 6 Drawing Sheets

TILED VIEW-MAPS FOR AUTOSTEREOSCOPIC INTERDIGITATION

This application claims the benefit of U.S. Provisional Patent Application Ser. No. 60/665,597, "Tiled View-Maps for Autostereoscopic Interdigitation," filed Mar. 26, 2005.

BACKGROUND OF THE INVENTION

1. Field of the Invention

The present invention relates to an autostereoscopic display system, and more specifically to a method of hardware based interdigitation for an autostereoscopic display system using component view-map tiles.

2. Description of the Related Art

Figure 1:
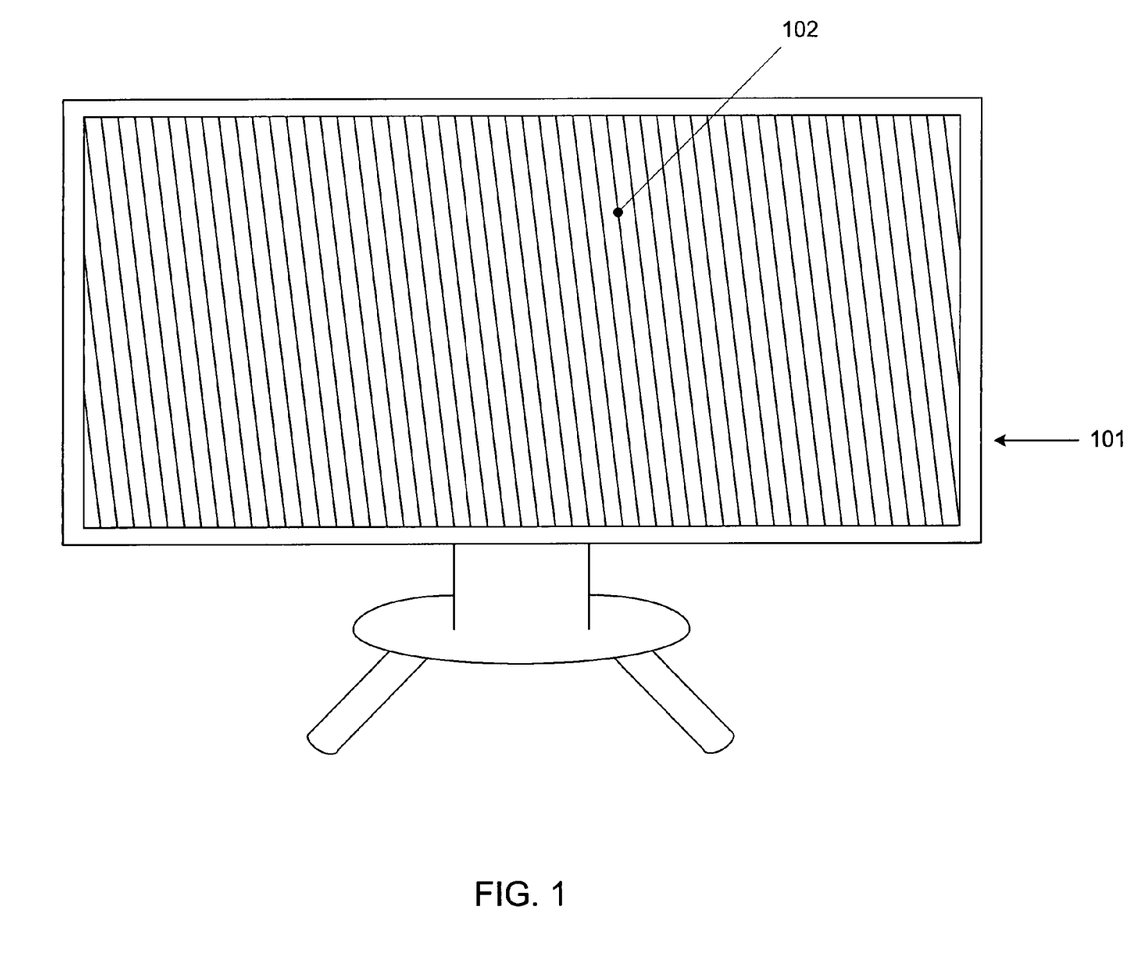
FIG. 1 illustrates a display with a lenticular screen attached thereto.

The StereoGraphics SynthaGram™ is an autostereoscopic imaging product that utilizes an array of (typically slanted) lenticular elements on the display surface as shown in FIG. 1. U.S. Pat. No. 3,409,351 to Winnek describes the slant, or a process in which the lenticular axis is tipped at an angle to the vertical edge of the display. Special software in the StereoGraphics SynthaGram™ arranges multiple-view image information using an interdigitation mapping technique, such that someone viewing the display will see one of the left-eye views with their left eye and one of the right-eye views with their right eye. This results in a stereoscopic viewing experience without the need to use special glasses, mirrors, or other stereo selection devices used at the eye.

Typically, in the StereoGraphics SynthaGram™, approximately nine different source-view images are provided, each representing a different viewpoint to be integrated into the autostereoscopic scene. These source-view images may be from a photographic source or a computer graphics source, and may have been prepared previously, or in real-time (effectively at the same time that they are being displayed). The number of views may be greater or less than nine without loss of generality.

The StereoGraphics SynthaGram™ algorithm for interdigitation is called Interzig, and the two terms will used interchangeably throughout this disclosure. The interdigitation process takes subpixels (a subpixel is the red, green, or blue component of a single pixel) from all of the different source-view images, and arranges the sub-pixels in the resultant interdigitated image. For example, a subpixel from a particular source-view image might be copied to the Interzigged image, if that subpixel will appear under the portion of a micro-lens in the lenticular array corresponding to a particular viewing zone for the person viewing the image.

The interdigitation process performs the mapping of subpixels with an understanding of the optical display properties. These include the physical arrangement of the lenticular array (pitch, slant, offset) as well as the viewing distance between a viewer and the interdigitated image.

Finally, Interzigged subpixel data is passed to the actual subpixels in the display device and passed through a lenticular microlens array, resulting in an autostereoscopic viewing experience.

To speed up the Interzig process, the system may create a view-map. The view-map is encoded to indicate the specific source-view image used as the source for any given subpixel appearing in the final image, and an example of such a view-map is shown in FIG. 3. The interdigitation process thus takes the source view images, such as nine such source-view images, and maps them to a single view-map image, thereby speeding up the interdigitation process. Having a pre-calculated view-map saves the trouble and computation time of repeatedly calculating which source-view image should be used per any given subpixel in the final image. Once the source-view image is determined, by using the view-map such as that shown in FIG. 3 as a look-up table, the system can determine the intensity of a particular subpixel based on the color component value of a pixel in the appropriate image-map location belonging to the source-view image to which the view-map value points.

The view-map can be applied efficiently using different implementations including pixel masking, where the view-map spawns a set of binary masks that filter source-view images, and pixel, where fast per-pixel calculations are performed by referencing a view-map stored in the graphics device's texture.

Even with high-speed algorithms such as those described above, a performance penalty can result from a significantly large view-map. As described above, the view-map matches the full size of the final image being generated (and may take up an even larger segment of video memory). If the view-map and possibly the binary masks that the view-map generates could be smaller, the system would require less graphics memory, and considerable processing speed benefits could be realized. Processing speed benefits generally result from a decreased time to swap textures in and out of limited texture memory. Depending on the application, additional textures may be used for visual effects (surface patterns). The view-map texture competes for memory space with these other textures. For example, a final image created for a full screen size of 3840×2400 pixels requires an excessively large view-map sized at 4096×4096, if the graphics device has a power-of-2 size limitation.

The present design seeks to cure the problem of view map performance and time penalties to increase the throughput of the device and increase viewer enjoyment of the resultant autostereoscopic image. It would be advantageous to offer a design that employs a view-map in a more efficient manner within an autostereoscopic display system, particularly a design that offers benefits over those previously available.

SUMMARY OF THE INVENTION

According to one aspect of the present invention, there is provided a method for creating a reduced sized view-map of an autostereoscopic source image. The method comprises creating a mathematical model for mapping the autostereoscopic source image into a first view-map, mapping the autostereoscopic source image into the first view-map, wherein the first view-map comprises a source view image value and a plurality of pixel locations comprising an origin pixel, scanning the first view-map for at least one pixel location whose source-view image value closely matches that of the origin pixel, and generating the reduced sized view-map by replicating matched pixel locations within the first view-map.

These and other advantages of the present invention will become apparent to those skilled in the art from the following detailed description of the invention and the accompanying drawings.

BRIEF DESCRIPTION OF THE DRAWINGS

FIG. 3 represents the view-map pattern, on which the interdigitation is based;

FIG. 5 shows a "brick" arrangement of view-map tiles where a horizontal offset is allowed between rows; and.

DETAILED DESCRIPTION OF THE INVENTION

This disclosure covers the mathematical interdigitation or Interzigging of source-view image data for autostereoscopic images viewed using a lenticular optical screen. FIG. 1 illustrates such a display with the lenticular screen attached. Display device 101 is the flat-panel display device, while screen 102 is a lenticular screen comprising a micro-lens array. Screen 102 is placed over the display surface in order to direct different components of the autostereoscopic view to different segments of a user's or viewer's viewing zone.

Figure 2:
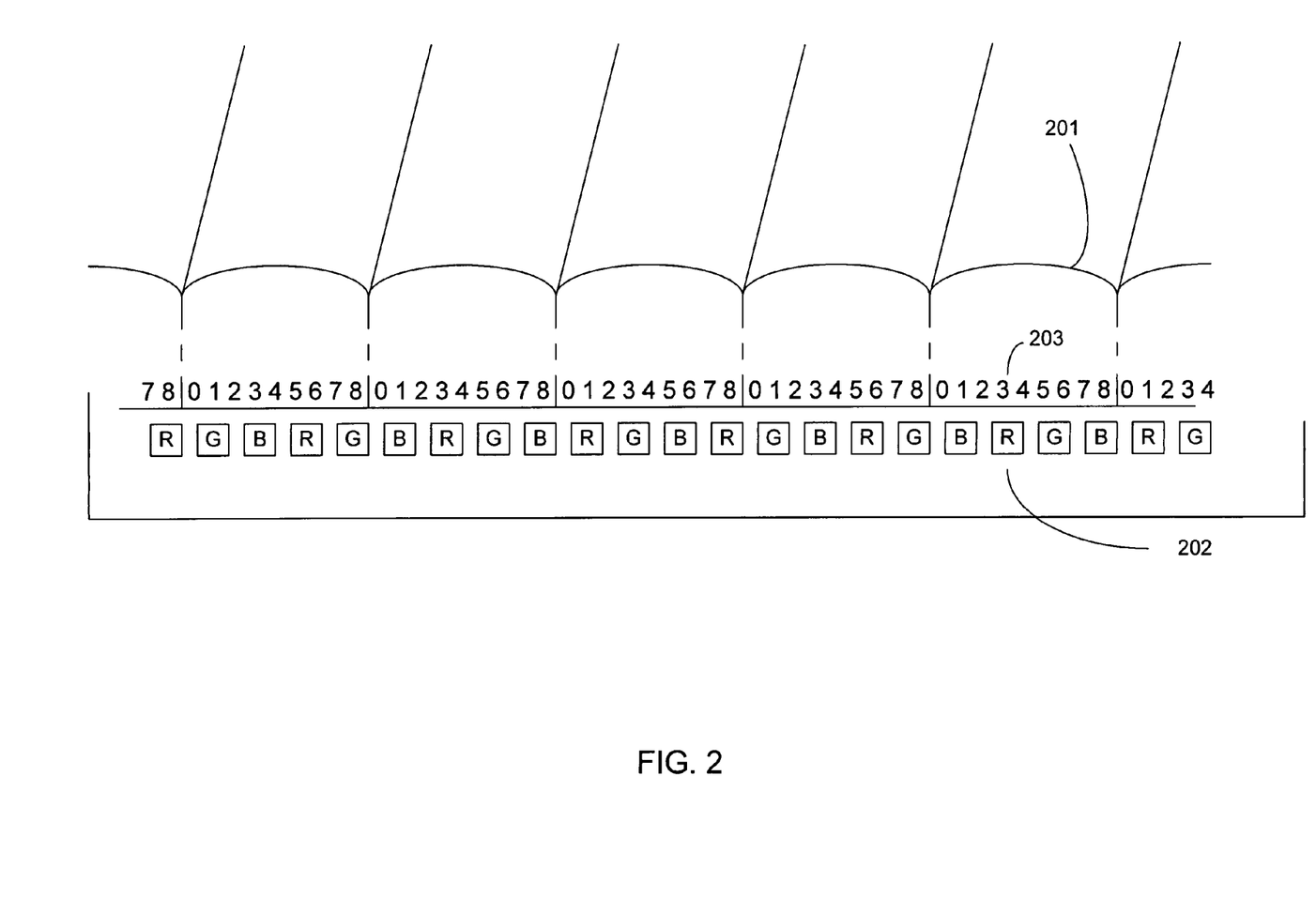
FIG. 2 shows a profile of a lenticule and the subpixels covered by the lenticule.

FIG. 2 shows a profile of one particular lenticule covering subpixels of the display device 101. Lenticule 201 is one lenticule of the micro-lens array. Here, the lens element faces out from the screen, but the lenticules may alternately be inward facing. Subpixels 202 represent the device subpixels, each of which generates a dot of light. With currently manufactured flat-panel displays, these device dots each carry either red (R), green (G), or blue (B) information. The essential attribute of subpixels 202 here is that they represent dots of light that are discrete and separately addressable, not that they are specifically red, green, and blue; future displays may arrange display dot elements to carry different kinds of color or light information, such as multi-color dot elements, for example. Region 203 shows that each lenticule is divided up into nine sub-regions (in this example, we assume that the autostereoscopic image uses nine source-view images), here numbered 0 through 8, corresponding to source-view images that may be represented under the appropriate lenticule sub-regions. For example, the middle source view, number 4, preferably has its data positioned directly underneath the middle sub-region of the lenticule.

As described above, the system uses a pre-calculated view-map as a map of the source-view image to be used for any given subpixel. This view-map guides the implementation of the interdigitation much more rapidly and efficiently than if the interdigitation process was based on repeated calculations of the particular source-view image to be used.

FIG. 3 illustrates an example of such a view-map. Region 301 shows that the view-map is an array of numbers. Single pixel 302 represents a portion of the view-map array that represents a single pixel. The pixel includes three subpixels in this arrangement, each subpixel representing a discrete addressable point of light on the display device. On the device shown, the subpixel set includes a red (R), green (G), and blue (B) subpixel. Red subpixel 303 represents a particular red (R) subpixel's location in the view-map. The value contained in this member of the view-map array happens to be 0, indicating that the corresponding device subpixel should obtain its graphical information from the corresponding source-view, #0.

In fact, the value pertaining to red subpixel 303 in this example 0 is likely to be an approximation, a round-off off of the actual source-view image value of that particular subpixel location. For example, the actual source-view image value may be 0.25, meaning that the corresponding device subpixel should ideally obtain its graphics information from a source-view that is ¼ of the way from source-view #0 to source-view #1. Since no source-view exists between source-view #0 and source-view #1, the source-view image value for that subpixel location must necessarily be rounded off from its actual value of 0.25 to the integer 0.

The present design outlines an enhanced, efficient view-map tiling solution, addressing the need for view-maps that are significantly smaller than the final interdigitated image that they map. View-maps, being smaller than full-image size can then be reused over different tiles, or portions, of the final image.

Generating smaller view-maps that effectively map the required views requires taking the mathematical model used to generate a view-map or a first view map and scanning the view-map for a pixel location whose source-view image value closely matches that of the origin pixel. Note that the source-view image value here represents the precise value, not the rounded off integer version of this value that ends up in the view-map. The mathematical model used to generate a view-map comprises an array of offset values. Typically nine source-view images are employed, but other numbers of source-view images may be used. With nine source-view images, the final view-map has each mapped subpixel pointing to one of nine source-view images, based on that subpixel's position beneath a lenticular optical element. Such a mapping is typically based on approximation of a best position to display the pixel such that when passing through the lenticule and to a viewer it results in an optimal viewing condition. For example, a particular subpixel location's calculation might call for a source-view image value of 4.3278; this value rounds off to 4, and so that subpixel location will receive a value of 4, meaning that source-view image #4 will be used to represent that subpixel in the final interdigitated autostereoscopic image.

Calculating the source-view image value for any given subpixel location typically entails a mapping calculation, where known values pertaining to the lenticular pitch, slant, position, and other physical attributes are used to determine precisely which portion of a given lenticular element reside over a particular position of a particular subpixel grid. There are various methods for performing this calculation, some involving iterative additions of offset values for each new pixel in a given row and each new row of an overall screen; other methods involve multiplying position values by pre-calibrated constant values. What is important is not how the mapping is calculated, but that the view-map ends up representing the positioning of lenticular elements above the full range of subpixel locations on the screen. As mentioned above, view-map calculations end up being rounded off to reflect the fact that a limited number of actual views are available, which are represented by integer source-view image values in the view-map.

In order to use a smaller view-map than the final interdigitated image, the system locates a repeating pattern in the nine source-images. The system locates a repeating pattern by scanning the source-images for such a repeating pattern, within a full-sized view-map, that closely matches the numeric pattern found near the origin of such a full-sized view-map. Thus, if the origin (very first) subpixel has a source-view image value of 1.3000, and another subpixel in the same row (and representing the same color component as the origin subpixel) has a source-view image value of 1.3000 as well (or something very close to that value), the view-map information starting from that second subpixel becomes redundant. In such a situation, a copy of the (smaller than full-width) view-map information up to that subpixel location may be reused starting at that subpixel.

Note that with respect to the source-image values employed at this point, such as 1.3000 in the above example, the system uses the accurate source-view image values rather than the rounded off integer values.

The general algorithm used to find an optimal tile size along a particular axis (horizontal or vertical) involves scanning along that axis for the lowest possible error. In the above example, the error would be 1.3000-1.3000, or 0.0000. In other words, error represents the difference between view image values between pixels, such as between adjacent pixels. Normally, an error of zero is not achieved, nor is such perfection necessary. More often, the error values will be fractional values. These fractional error values may then be multiplied by the number of times that the error will be compounded to determine the total error. To use another example: If the horizontal pixel size of the final image is 1600, where a tile dimension of 300 is being tested, that tile size may result in an error value of 0.06 per tiling instance (six errors per 100 tiles). The total error in this example will actually be approximately (1600/300×0.06), or about 0.3. The objective is to scan for a tile dimension whose total error, over the full area of the resulting image, is minimized.

Figure 4:
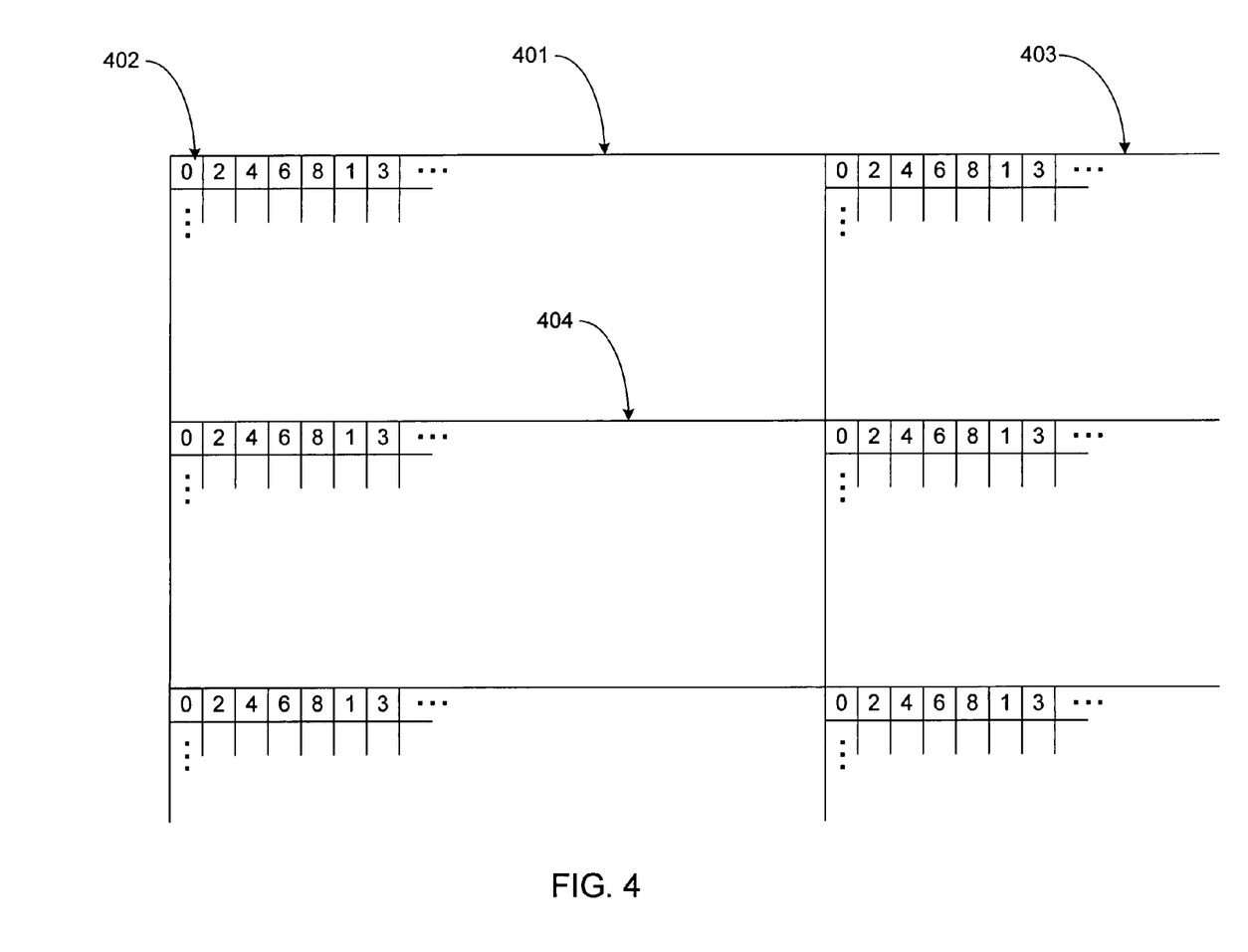
FIG. 4 shows an arrangement where view-map tiles are arranged in a grid fashion.

Across the two dimensions, horizontal and vertical, two general classes of rectangular area tiling schemes exist: A grid arrangement with no horizontal offset between rows, and a "bricks" arrangement with some horizontal offset between rows. The grid arrangement is shown in FIG. 4 and is simplest to generate, and simplest to utilize. In FIG. 4, tile 401 is a tile in the upper-left corner of a representation of the image area. Region 402 shows that this tile contains a view-map, similar to that in FIG. 3, having its origin at the corner of the tile. Tile 403 is a separate tile instance in the image area. Note that the origin of this tile has exactly the same view-map data (the source-view image values all being {0, 2, 4, 6, 8, 1, 3, . . . } as is used in tile 401. This tile instance has a horizontal offset from the previous tile. Tile 404 is yet another tile instance, appearing directly below another tile. Note that the full set of tiles in FIG. 4 form a grid arrangement. The result is that the system has multiple regions of the screen area, those collective regions forming a grid.

All of these regions have identical or very similar corresponding source-view image values. This substantial similarity allows the system to utilize one relatively small view-map to represent any of these numerous tiled areas of the overall screen.

Figure 5:
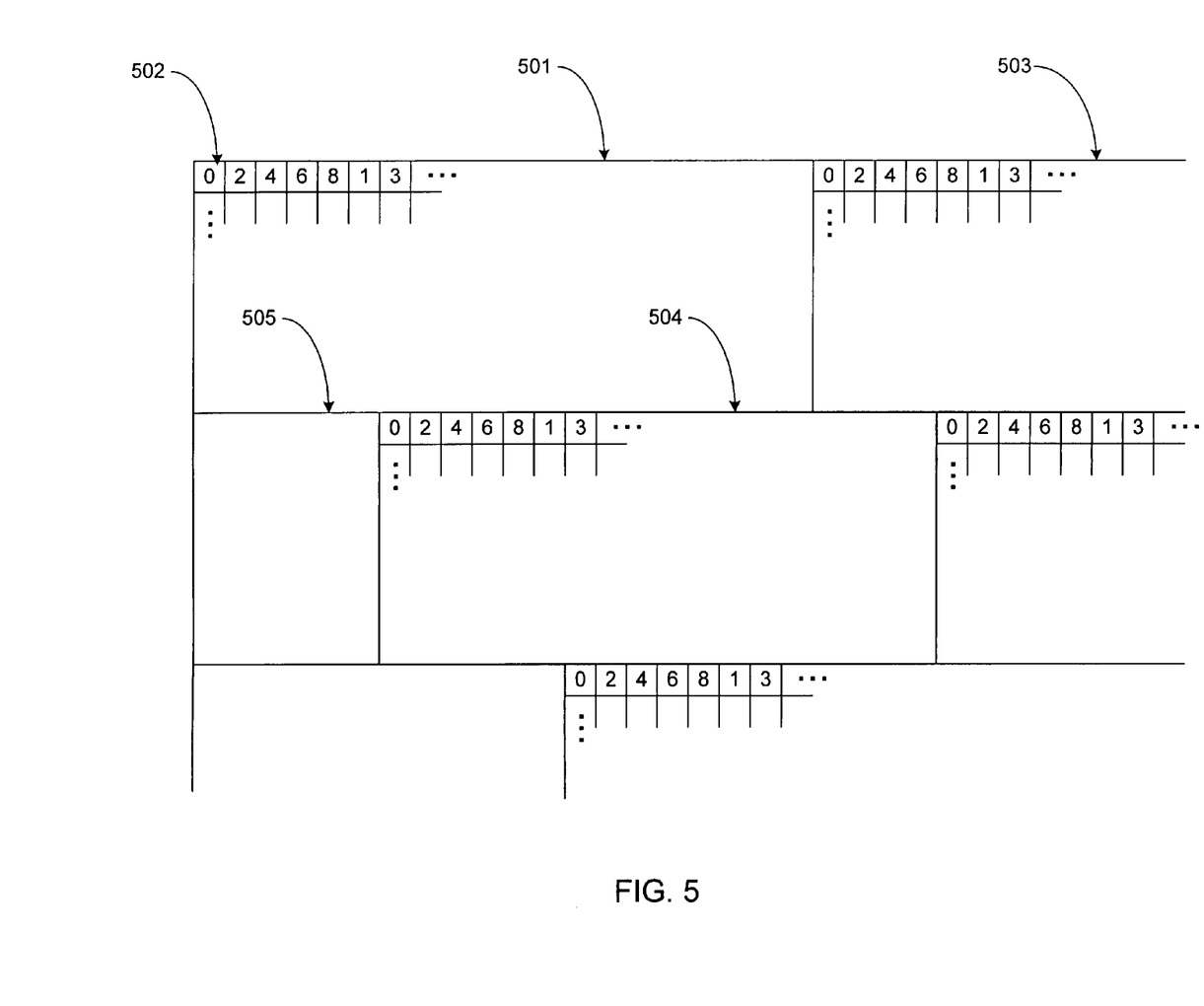

Determining grid size is a matter of finding the optimal horizontal tile dimension, where optimal indicates a minimized total error along that dimension, and finding the optimal vertical tile dimension. The advantage of a "bricks" tiling arrangement, such as that shown in FIG. 5, with a horizontal offset between rows, is that a smaller total error may result in the vertical dimension if the tile position is not restricted to being directly above or below other tiles. In FIG. 5, tile 501 is a tile in the upper-left corner of a representation of the image area. Region 502 represents this tile's view-map, with its origin at the corner of the tile. Tile 503 is a separate tile instance in the image area, with the origin having the same view-map data as is used in tile 501. Tile 504 is a tile instance in the following row. Note that tile 504 is not directly below any of the tiles in the above row; there is a horizontal offset, resulting in a "brick" like arrangement. Tile 505 shows that when using this "brick" layout, some tiles will result where the view-map origin precedes the overall image origin, i.e. a partial overall image will be presented.

Note that the examples presented in the figures assume that the pixel-map origin (applying to the display, view-map, tiling scheme, and final image) is at the upper-left corner. The same general principles and methods of operation would apply to different coordinate schemes, such as schemes or layouts having a bottom-left origin.

Further reductions in total error values can be achieved with an additional technique: Allowing the tiled view-map to point to source-view images indirectly, based on an increment value that is added to the view-map index, such as the one shown in FIG. 6. Such additional processing can help the tiling scheme deliver closer to perfect results.

For example, if one tile has source-view image values of {1, 2, 3, 4, 5, . . . }, and another tile has source-view image values of {3, 4, 5, 6, 7, . . . }, the latter tile can be represented by the same view-map used for the first view-map, except that a value of 2 must be added to each source-view image value. The advantage of this technique is that it increases, by a factor of the number of source-views, the number of tiling schemes possible, thus increasing the accuracy (minimizing the error) of the best tiling scheme(s), all other factors being the same.

Figure 6:
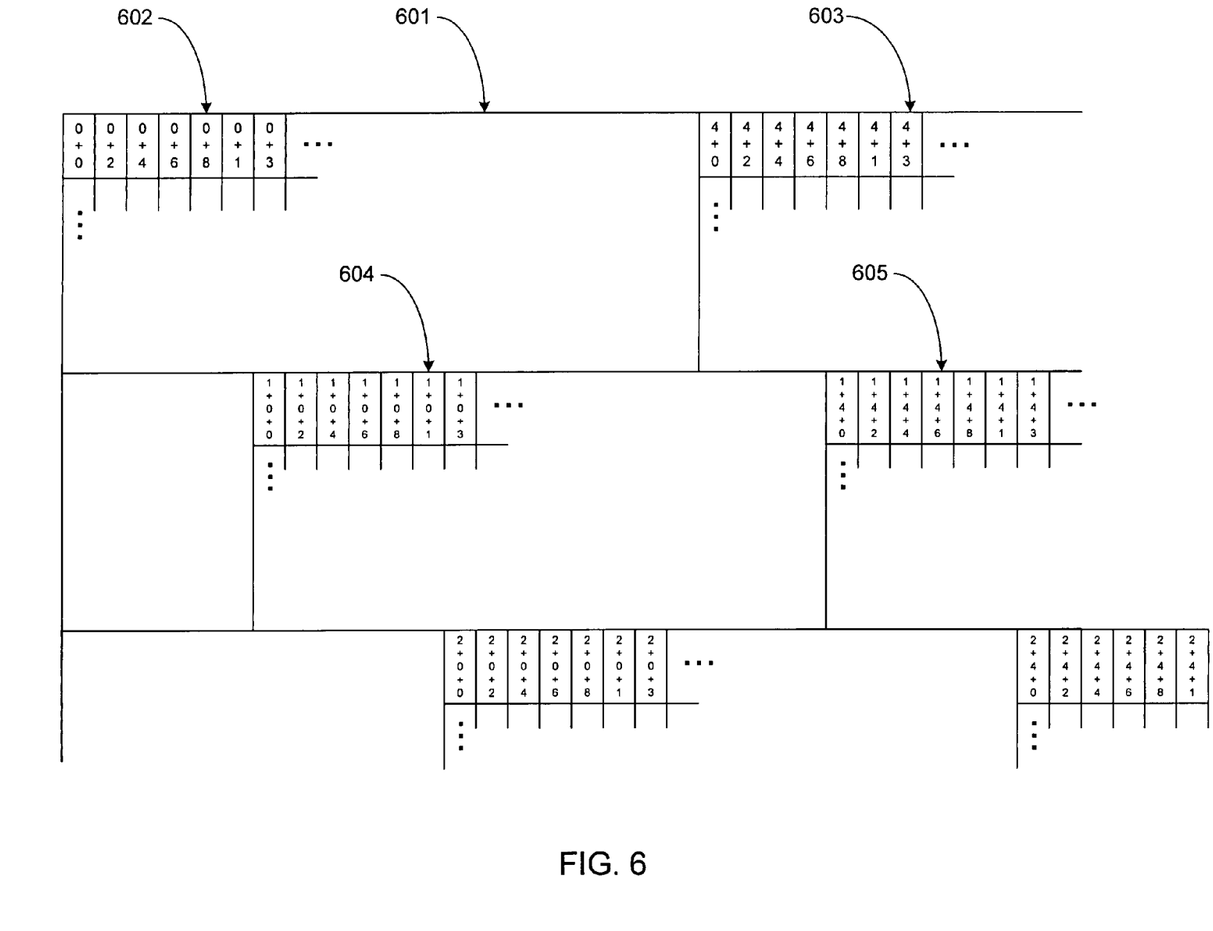
FIG. 6 shows a variation of the tiled view-map implementation.

To use a more specific example, tile 601 in FIG. 6 shows a tile in the upper-left corner of a representation of the image area. Region 602 is tile 601's view-map, a two-dimensional array of numbers starting (in this example) with 0, 2, 4, 6, 8, 1, 3, . . . Tile 603 is the next tile instance. In the example of FIG. 6, we use the same view-map data array (once again starting with 0, 2, 4, 6, 8, 1, 3, . . . ), but for each subpixel the system adds, in this example, a value of 4. Note that if the sum equals or exceeds the total number of source-view images (9), the system subtracts that number to normalize the index value. Thus, subpixels in this tile 603 use source-view images 4+0, 4+2, 4+4, 4+6−9, 4+8−9, 4+1, 4+3, . . . Tile 604 is a tile instance in the following row. As with tile 603, the system uses the same view-map and associated data, but the system applies a different offset factor (in this example, 1) for the next-row implementation of the tile. Thus this enhancement entails applying at least one offset factor to all subsequent tiles, reducing the need for processing and producing acceptable overall viewing results.

Tile 605 is a tile instance offset horizontally from tile 604. Tile 605 uses the view-map data, added to the vertical tile offset value (1) that was also used in 604, and added to the horizontal tile offset value (4) used in tile 603.

As shown in the example of FIG. 6, the origin subpixel of a view-map might specify source-view image #0, which would be correct for the origin subpixel's very first tiling position. However, for the origin subpixel's next horizontal tiling position, that subpixel's view-map value of 0 would have an offset value added to it, such as an offset value of 4. Thus, for the new tile position, the view-map value actually prescribes source-view image #4 (0+4). For the next horizontal tiling position, the system adds the offset value of 4 yet again, 0+4+4=8. After that, the system adds the offset value of 4 yet again, yielding 8+4=12. The system subtracts the number of source-view images (again, typically 9) to normalize the value within the acceptable range from 0 to 8, 12−9=3, meaning that the system now points to source-view image #3. A different offset value may be applied to different row instances of the view-map tile.

In optimizing for this better method, where the view-map points to source-view images based on a tile increment, the error value minimized is no longer the non-integer source-view value calculated for some subpixel minus the source-view value of the origin subpixel. Instead, the system aims to minimize the difference between the fractional portion of the arbitrary subpixel's calculated source-view value and the fractional portion of the origin subpixel's source-view value. Changing the optimization to just compare fractional portions of the numbers (which range from 0 to the total number of source-view images, typically 9) can improve the selection of optimization candidates significantly.

Interdigitated stereoscopic images can appear acceptably seamless if the overall total tiling error is within approximately 5% of the range that would round off to a single source-view image. In experiments, the just described technique of pointing to source-view images using an incremented index value nearly can yield a tiling solution with a total tiling error factor below 5%. Consequently, using tiled view-maps, the present design produces interdigitated stereoscopic images that appear seamless, accompanied by greatly improved processing speed compared to using full-sized view-maps.

In some cases, additional performance benefits may be derived from keeping the total number of tiles within a particular maximum limit. The processing time advantage in having a smaller view-map size might be outweighed by the amount of time the view-map needs to be applied to complete the display, depending on the computational hardware and implementation. The algorithm that finds the optimal tiling scheme can be modified to restrict solutions according to this and other possible restrictions.

Before the tiling scheme can be applied, such a scheme needs to be described by a set of numbers that constitutes the tiling specification. The objective is to represent the tiling scheme in a relatively simple manner such that the system assembling interdigitated images for autostereoscopic display can apply the view-map, which is smaller than full-screen, accurately to tiled regions of the screen. Such assembling results in a visually seamless effect, and autostereoscopic graphics as good as using a full-screen view-map.

The tiling specification includes several numerical components. First, the view-map tile has horizontal and vertical pixel dimensions. The computer system can assume that additional positionings of the view-map tile should occur following, and immediately adjoining, the previous tile, both horizontally and vertically. Where the tiling methodology employs a horizontal offset on subsequent rows for a "brick"-like tile layout, the tiling specification also needs to specify the horizontal offset per vertical row. If the tiling methodology is to address source-view images based on an increment applied to the value indicated by the view-map, the tiling specification needs to indicate the particular amount of that increment. The tiling specification might typically include a separate increment value for the horizontal and vertical tiling dimensions. Tiling error information may be included as part of the tiling specification, for the express purpose of judging whether results are acceptable. For example, if a 5 per cent tiling error is acceptable, the tiling specification may include this value such that a tiling error in excess of five per cent indicates an unacceptable solution.

The system may apply the tiling scheme programmatically, determining where each instance of the view-map tile overlays the overall interdigitated image being produced. The computer or display system implementation can lay out the tiles based on the particular tiling specification that has been calculated. If source-view increment values are used as part of the tiling model (such as was illustrated in FIG. 6), the computer or display system implementation will need to apply these increment values correctly according to the tiling model and specification, which will typically involve recalculating increment values for each tile position, based on horizontal and vertical increment offset values indicated by the tiling specification.

With respect to the tiling specification, a computer or display system applies to the current tiling scheme, and that application typically involves obeying rules about the nature of how tiles are to be laid out, subject to the constraints specified for the tiling model being implemented. The simple example is a grid tiling (with no view-map increments used). In a grid tiling scenario, the "rules" might be to base the first tile at the screen origin, and base all subsequent tiles (horizontally and vertically) such that they fall adjacent to the previous tiles. With horizontal-offset tiles, the tiling scheme and its implementation may additionally need to both specify what the horizontal offset per row is and how the horizontal offset is to apply. Thus tiling specifications are highly dependent upon the specific needs addressed and the desired performance or activities.

Where the system applies tiles using an increment value for view-map interpretation (where one tile might be 1, 2, 3, . . . , the next tile horizontally might be 3, 4, 5, . . . , and the next tile vertically from the first tile might be 7, 8, 0, 1, . . . ), a rule-set is established together with a specification that abides by that rule-set, in order to insure that increment values are applied simply and accurately. Multiple rule-sets for performing this function may be employed, but one such rule-set may be employed having a horizontal and vertical increment value added for each successive tile that appears horizontally and vertically.

The present design is generally hardware independent in the sense that it may be run on any general high performance computational architecture or hardware. The autostereoscopic interdigitation processing using tiled view-maps disclosed herein may encompass processing on a general purpose or specialized high performance computer known generally to those skilled in the art.

The design presented herein and the specific aspects illustrated are meant not to be limiting, but may include alternate components while still incorporating the teachings and benefits of the invention, namely the improved system and method of parallax correction. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for creating a reduced sized view-map of an autostereoscopic source image using a computational device, comprising:

receiving a version of the autostereoscopic source image at the computational device;

mapping the autostereoscopic source image into a first view-map using the computational device, wherein the first view-map comprises a source-view image value and a plurality of pixel locations comprising an origin pixel;

scanning the first view-map using the computational device for at least one pixel location whose source-view image value closely matches that of the origin pixel; and causing the computational device to generate the reduced sized view-map by replicating matched pixel locations found within the first view-map.

2. The method of claim 1, wherein said mapping employs a mathematical model comprising an array of pixel offset values representing a pixel offset from a corresponding pixel in the autostereoscopic source image.

3. The method of claim 1, wherein each mapped subpixel in the reduced sized view-map points to one of multiple source-view images.

4. The method of claim 1, wherein each mapped subpixel in the reduced sized view-map points to source-view images indirectly based on an increment value added to pixel quantities in the first view-map.

5. The method of claim 1, wherein said scanning comprises scanning horizontally through pixel regions free of horizontal offsets therebetween.

6. The method of claim 1, wherein said scanning comprises scanning horizontally through pixel regions having horizontal offsets therebetween.

7. A method for creating a reduced sized view-map of an autostereoscopic source image using a computational device, comprising:
  mapping the autostereoscopic source image into a first view-map using the computational device, wherein the first view-map comprises a source-view image value and a plurality of pixel locations comprising an origin pixel;
  scanning the first view-map for at least one pixel location whose source-view image value most closely matches that of the origin pixel using the computational device; and
  causing the computational device to generate the reduced sized view-map by replicating matched pixel locations found within the first view-map.

8. The method of claim 7, further comprising creating a mathematical model for mapping the autostereoscopic source image into the first view-map prior to said mapping.

9. The method of claim 8, wherein the mathematical model comprises an array of pixel offset values representing a pixel offset from a corresponding pixel in the autostereoscopic source image.

10. The method of claim 8, wherein each mapped subpixel in the reduced sized view-map points to one of multiple source-view images.

11. The method of claim 8, wherein each mapped subpixel in the reduced sized view-map points to source-view images indirectly based on an increment value added to pixel quantities in the first view-map.

12. The method of claim 8, wherein said scanning comprises scanning horizontally through pixel regions free of horizontal offsets therebetween.

13. The method of claim 8, wherein said scanning comprises scanning horizontally through pixel regions having horizontal offsets therebetween.

14. A method for generating a reduced sized view-map of an autostereoscopic source image, comprising:
  causing a computational device to operate in a manner comprising:
    receiving the autostereoscopic source image:
    dividing the autostereoscopic source image into multiple source images;
    generating a full sized view map based on the autostereoscopic source image;
    locating a repeating pattern in the multiple source images by scanning the multiple source images for at least one subpixel having a subpixel numeric pattern that closely matches a numeric pattern found near an origin of the full sized view-map; and
    reusing a copy of view-map information up to that subpixel location starting at that subpixel to create a reduced sized view-map.

15. The method of claim 14, said causing further comprising creating a mathematical model for mapping the autostereoscopic source image into the first view-map prior to said generating.

16. The method of claim 15, wherein the mathematical model comprises an array of pixel offset values representing a pixel offset from a corresponding pixel in the autostereoscopic source image.

17. The method of claim 14, wherein each mapped subpixel in the reduced sized view-map points to one of multiple source-view images.

18. The method of claim 14, wherein each mapped subpixel in the reduced sized view-map points to source-view images indirectly based on an increment value added to pixel quantities in the first view-map.

19. The method of claim 14, wherein said locating comprises scanning horizontally through pixel regions free of horizontal offsets therebetween.

20. The method of claim 14, wherein said locating comprises scanning horizontally through pixel regions having horizontal offsets therebetween.

* * * * *